(12) United States Patent
Zhong et al.

(10) Patent No.: US 11,043,000 B2
(45) Date of Patent: Jun. 22, 2021

(54) MEASURING METHOD AND APPARATUS FOR DAMAGED PART OF VEHICLE

(71) Applicant: Baidu Online Network Technology (Beijing) Co., Ltd., Beijing (CN)

(72) Inventors: Yongfeng Zhong, Beijing (CN); Xiao Tan, Beijing (CN); Feng Zhou, Beijing (CN); Hao Sun, Beijing (CN); Errui Ding, Beijing (CN)

(73) Assignee: BAIDU ONLINE NETWORK TECHNOLOGY CO., LTD., Beijing (CN)

( * ) Notice: Subject to any disclaimer, the term of this patent is extended or adjusted under 35 U.S.C. 154(b) by 80 days.

(21) Appl. No.: 16/565,683

(22) Filed: Sep. 10, 2019

(65) Prior Publication Data

US 2020/0005478 A1    Jan. 2, 2020

(30) Foreign Application Priority Data

Oct. 11, 2018   (CN) .......................... 201811181292.8

(51) Int. Cl.
*G06T 7/62* (2017.01)
*G06T 7/73* (2017.01)
(Continued)

(52) U.S. Cl.
CPC .................. *G06T 7/62* (2017.01); *G06T 3/00* (2013.01); *G06T 7/0002* (2013.01); *G06T 7/75* (2017.01);
(Continued)

(58) Field of Classification Search
CPC combination set(s) only.
See application file for complete search history.

(56) References Cited

U.S. PATENT DOCUMENTS 8,035,639 B2 * 10/2011 Witte ................. G06K 9/00208
                                                                345/419
9,886,771 B1 *  2/2018 Chen .................... G06F 3/04845
(Continued)

FOREIGN PATENT DOCUMENTS

CN           108364253 A         8/2018

OTHER PUBLICATIONS

Sun Yan et al., "Vision Measurement Technology Research for Model Angle of Attack in Wind Tunnel Tests." Acta Aeronautica et Astronautica Sinica, vol. 34, No. 1, 1-7 dated Jan. 23, 2013.

*Primary Examiner* — Tsung Yin Tsai
(74) *Attorney, Agent, or Firm* — Harness, Dickey & Pierce, P.L.C.

(57) ABSTRACT

Provided are a measuring method and apparatus for a damaged part of a vehicle includes: acquiring an image to be processed of a vehicle; acquiring the damaged part of the vehicle in the image to be processed according to the image to be processed; acquiring first position information of key points in the image to be processed according to the image to be processed; determining a transformation relation between the image to be processed and a first fitting plane according to the key points included in the image to be processed and the first position information, where the first fitting plane is a fitting plane determined according to the key points included in the image to be processed on the 3D model; acquiring a projection area of the damaged part in the first fitting plane according to the transformation relation; and measuring the projection area to acquire a measuring result.

17 Claims, 5 Drawing Sheets

(51) Int. Cl.
*G06T 3/00* (2006.01)
*G06T 7/00* (2017.01)
*G06Q 40/08* (2012.01)

(52) U.S. Cl.
CPC .......... *G06Q 40/08* (2013.01); *G06T 2200/04* (2013.01); *G06T 2207/20084* (2013.01); *G06T 2207/30248* (2013.01)

(56) References Cited

U.S. PATENT DOCUMENTS

| | | | |
|---|---|---|---|
| 10,229,330 B2* | 3/2019 | Li | G06K 9/4628 |
| 10,614,592 B2* | 4/2020 | Sun | G06T 7/75 |
| 10,699,168 B1* | 6/2020 | Xu | G06N 20/00 |
| 10,762,385 B1* | 9/2020 | Yang | G06N 3/08 |
| 10,789,786 B2* | 9/2020 | Zhang | G06T 7/0002 |
| 2012/0076437 A1* | 3/2012 | King | G06Q 10/10 |
| | | | 382/286 |
| 2017/0068756 A1* | 3/2017 | Wilsher | G06F 30/20 |
| 2018/0260793 A1* | 9/2018 | Li | G06T 7/001 |
| 2018/0293552 A1* | 10/2018 | Zhang | G06K 9/00664 |
| 2020/0111203 A1* | 4/2020 | Tan | G06K 9/6268 |

* cited by examiner

MEASURING METHOD AND APPARATUS FOR DAMAGED PART OF VEHICLE

CROSS-REFERENCE TO RELATED DISCLOSURES

This application claims priority to Chinese Application No. CN 201811181292.8, filed on Oct. 11, 2018, which is hereby incorporated by reference in its entirety.

TECHNICAL FIELD

The present disclosure relates to the field of data processing, and in particular, to a measuring method and apparatus for a damaged part of a vehicle.

BACKGROUND

In recent years, with the increasing number of automobile owners, the amount of automobile damage caused by traffic accidents or the like has been at a high level. After an occurrence of the automobile damage, a damaged part of a vehicle is required to be measured frequently to be a basis of a claim to an insurance company.

At present, the damage-assessment for the damaged part of the vehicle is normally done at the scene of the vehicle accident by a field investigator.

The field investigator is required to work on the scene, which has a high labor cost, a long processing time and tends to cause traffic congestion. Furthermore, when manually assessing the damage on the scene, only a qualitative determination is typically made regarding the damaged part, which leads to a low efficiency and accuracy in vehicle damage assessment.

SUMMARY

The present disclosure provides a measuring method and apparatus for a damaged part of a vehicle, which can improve the damage-assessment accuracy and efficiency of a damaged part.

In a first aspect, the present disclosure provides a measuring method for a damaged part of a vehicle, including:
acquiring an image to be processed of a vehicle;
acquiring the damaged part of the vehicle in the image to be processed according to the image to be processed;
acquiring first position information of key points included in the image to be processed according to the image to be processed, where the key points are points provided at preset positions of a 3D model of the vehicle;
determining a transformation relation between the image to be processed and a first fitting plane according to the key points included in the image to be processed and the first position information, where the first fitting plane is a fitting plane determined according to the key points included in the image to be processed on the 3D model;
acquiring a projection area of the damaged part in the first fitting plane according to the transformation relation; and
measuring the projection area to acquire a measuring result.

In an implementation, the determining a transformation relation between the image to be processed and a first fitting plane according to the key points included in the image to be processed and the first position information includes:
determining the first fitting plane according to the key points included in the image to be processed;
acquiring second position information of the key points included in the image to be processed in the first fitting plane; and
determining the transformation relation between the image to be processed and the first fitting plane according to the first position information and the second position information.

In an implementation, the determining the first fitting plane according to the key points included in the image to be processed includes:
acquiring multiple standard fitting planes of the 3D model, the standard fitting planes being fitting planes determined according to at least three preset key points on the 3D model; and
determining the first fitting plane in the multiple standard fitting planes according to the key points included in the image to be processed.

In an implementation, the acquiring multiple standard fitting planes of the 3D model includes:
acquiring three-dimensional coordinates of multiple preset key points on the 3D model;
acquiring three-dimensional coordinates of multiple preset key points on the 3D model;
acquiring distances between the multiple preset key points according to the three-dimensional coordinates of the multiple preset key points;
acquiring at least one key point group according to the distances, the key point group including at least three preset key points, and a union of the at least one key point group including all preset key points of the 3D model; and
for each of the key point groups, if the preset key points included in the key point group are coplanar, fitting the preset key points included in the key point group to acquire a standard fitting plane.

In an implementation, the determining the first fitting plane in the multiple standard fitting planes according to the key points included in the image to be processed includes:
determining the first fitting plane according to identifications of the key points included in the image to be processed and identifications of preset key points included in each of the standard fitting planes.

In an implementation, the acquiring a projection area of the damaged part in the first fitting plane according to the transformation relation includes:
acquiring outline points of the damaged part and third position information of the outline points in the image to be processed;
acquiring fourth position information of the outline points in the first fitting plane according to the third position information and the transformation relation; and
determining the projection area according to the fourth position information.

In an implementation, the acquiring the damaged part of the vehicle in the image to be processed according to the image to be processed includes:
inputting the image to be processed into a first neural network model to acquire the damaged part, the first neural network model being used to acquire a damaged part of a vehicle in an image.

In an implementation, the acquiring first position information of key points included in the image to be processed according to the image to be processed includes:
annotating the key points in the image to be processed; and
inputting the image to be processed, of which the key points have been annotated, into a second neural network model to acquire the first position information of the key points in the image to be processed, the second neural network model being used to acquire position information of key points in an image.

In an implementation, the measuring result includes at least one of: a length, a width, and an area of the damaged part, where the length of the damaged part is a length of a minimum rectangle circumscribing the projection area;

the width of the damaged part is a width of the minimum rectangle circumscribing the projection area; and the area of the damaged part is an area of the projection area.

In a second aspect, the present disclosure provides a measuring apparatus for a damaged part of a vehicle, including:

an image acquiring module, configured to acquire an image to be processed of a vehicle;

a first part determining module, configured to acquire the damaged part of the vehicle in the image to be processed according to the image to be processed;

a position acquiring module, configured to acquire first position information of key points included in the image to be processed according to the image to be processed, where the key points are points provided at preset positions of a 3D model of the vehicle;

a relation acquiring model, configured to determine a transformation relation between the image to be processed and a first fitting plane according to the key points included in the image to be processed and the first position information, where the first fitting plane is a fitting plane determined according to the key points included in the image to be processed on the 3D model;

a second part determining module, configured to acquire a projection area of the damaged part in the first fitting plane according to the transformation relation; and a measuring module, configured to measure the projection area to acquire a measuring result.

In an implementation, the relation acquiring module is specifically configured to:

determine the first fitting plane according to the key points included in the image to be processed;

acquire second position information of the key points included in the image to be processed in the first fitting plane; and determine the transformation relation between the image to be processed and the first fitting plane according to the first position information and the second position information.

In an implementation, the relation acquiring module is specifically configured to:

acquire multiple standard fitting planes of the 3D model, the standard fitting planes being fitting planes determined according to at least three preset key points on the 3D model; and determine the first fitting plane in the multiple standard fitting planes according to the key points included in the image to be processed.

In an implementation, the relation acquiring module is specifically configured to:

acquire three-dimensional coordinates of multiple preset key points on the 3D model;

acquire distances between the multiple preset key points according to the three-dimensional coordinates of the multiple preset key points;

acquire at least one key point group according to the distances, the key point group including at least three preset key points, and a union of the at least one key point group including all preset key points of the 3D model; and for each of the key point groups, if the preset key points included in the key point group are coplanar, fit the preset key points included in the key point group to acquire a standard fitting plane.

In an implementation, the relation acquiring module is specifically configured to:

determine the first fitting plane according to identifications of the key points included in the image to be processed and identifications of preset key points included in each of the standard fitting planes.

In an implementation, the second area acquiring module is specifically configured to:

acquire outline points of the damaged part and third position information of the outline points in the image to be processed;

acquire fourth position information of the outline points in the first fitting plane according to the third position information and the transformation relation; and determine the projection area according to the fourth position information.

In an implementation, the first part determining area is specifically configured to:

input the image to be processed into a first neural network model to acquire the damaged part, the first neural network model being used to acquire a damaged part of a vehicle in an image.

In an implementation, the position acquiring module is specifically configured to:

annotate key points in the image to be processed; and input the image to be processed, of which the key points have been annotated, into a second neural network model to acquire the first position information of the key points in the image to be processed, the second neural network model being used to acquire position information of key points in an image.

In an implementation, the measuring result includes at least one of: a length, a width and an area of the damaged part, where the length of the damaged part is a length of a minimum rectangle circumscribing the projection area;

the width of the damaged part is a width of the minimum rectangle circumscribing the projection area; and the area of the damaged part is an area of the projection area.

In a third aspect, the present disclosure provides a measuring apparatus for a damaged part of a vehicle, the apparatus including a processor and a memory. The memory is configured to store instructions, and the processor is configured to execute the instructions stored in the memory to cause the apparatus to execute the measuring method for a damaged part of a vehicle according to any one of the implementations of the first aspect.

In a fourth aspect, embodiments of the present disclosure provide a storage medium, including: a readable storage medium; and computer programs used to implement the measuring method for a damaged area of a vehicle according to any one of the implementations of the first aspect.

In a fifth aspect, embodiments of the present disclosure provide a program product, the program product including a computer program (i.e., execution instructions) stored in a readable storage medium. At least one processor may read the computer program from the readable storage medium and execute the computer program to enable a device to implement the measuring method for a damaged part of a vehicle provided in any one of the implementations of the first aspect.

The measuring method and apparatus for a damaged part of a vehicle provided in the present disclosure includes: acquiring an image to be processed of a vehicle; acquiring the damaged part of the vehicle in the image to be processed according to the image to be processed; acquiring first position information of key points included in the image to be processed according to the image to be processed; determining a transformation relation between the image to be processed and a first fitting plane according to the key points included in the image to be processed and the first position information, where the first fitting plane is a fitting plane determined according to the key points included in the image to be processed on the 3D model; acquiring a projection area of the damaged part in the first fitting plane according to the transformation relation; and measuring the projection area to acquire a measuring result. By acquiring the projection area corresponding to the damaged part in the plane fitted through a partial outer surface of the vehicle, quantitive values of the damaged part can be acquired by measuring the projection area, thereby improving the damage-assessment accuracy and efficiency of the damaged part.

BRIEF DESCRIPTION OF DRAWING(S)

In order to illustrate the technical solutions in the embodiments of the present disclosure or the prior art more clearly, a brief introduction will now be made to the drawings used in the description of the embodiments or the prior art. Obviously, the drawings in the following descriptions are simply some embodiments of the present disclosure, and other drawings can be obtained by those skilled in the art without paying any inventive labor.

DESCRIPTION OF EMBODIMENTS

In order to make the purposes, technical solutions and advantages of embodiments of the present disclosure clearer, the technical solution of the present disclosure will be described in detail below with reference to the accompanying drawings. It is evident that the embodiments described are only some embodiments of the present disclosure, rather than all of them. All other embodiments obtained by those skilled in the art based on embodiments of the present disclosure without paying creative efforts are within the protective scope of the present disclosure.

Figure 1:
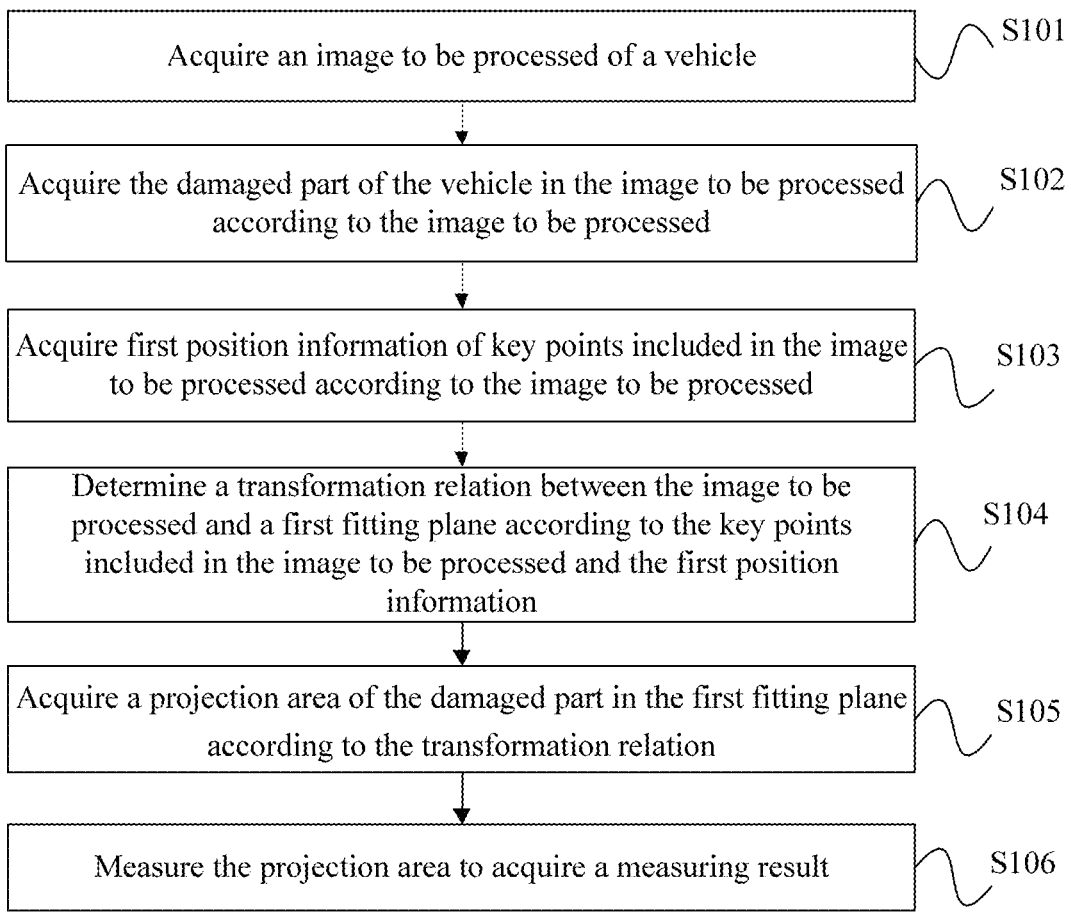
FIG. 1 is a flowchart of a measuring method for a damaged part of a vehicle according to an embodiment of the present disclosure.

FIG. 1 is a flowchart of a measuring method for a damaged part of a vehicle according to an embodiment of the present disclosure. According to the measuring method for a damaged part of a vehicle provided in the embodiment, the execution body of the method may be an apparatus for measuring the damaged part of the vehicle. As shown in FIG. 1, the measuring method for a damaged part of the vehicle may include:

S101: acquire an image to be processed of the vehicle.

The image to be processed of the vehicle can be acquired by photographing the damaged part of the vehicle. The vehicle image to be processed may include the damaged part of the vehicle.

S102: acquire the damaged part of the vehicle in the image to be processed according to the image to be processed.

In an implementation, in an implementation, the acquiring the damaged part of the vehicle in the image to be processed according to the image to be processed may include:

processing the image to be processed with an image processing method to acquire the damaged part in the image to be processed.

Due to the variety of image processing methods available and the maturity of their disclosures, it is easy to implement the acquiring of the damaged part of the vehicle with an image processing method.

It should be explained that the embodiment does not limit the type of the image processing method.

In an implementation, in another implementation, the acquiring the damaged part of the vehicle in the image to be processed according to the image to be processed may include:

inputting the image to be processed into a first neural network model to acquire the damaged part. The first neural network model is used to acquire a damaged part of a vehicle in an image.

Specifically, the first neural network model may be pre-trained. An input to the first neural network is a damage-assessment image of a vehicle, and an output thereto is a damaged part of the vehicle in the image.

By acquiring the damaged part of the vehicle through a neural network algorithm, a processing efficiency in identifying the damaged part can be improved.

S103: acquire first position information of key points included in the image to be processed in the image to be processed according to the image to be processed.

The key points are points provided at preset positions on a 3D model of the vehicle.

Specifically, the key points are provided at positions of significance on the 3D model of the vehicle. In an implementation, each preset key point has a unique identification. In the present disclosure, in order to distinguish key points preset on the 3D model from key points included in the image to be processed, the key points preset on the 3D model can be referred to as preset key points. After acquiring the key points included in the image to be processed, position information of the key points in the image to be processed can be acquired, which may be referred to as first position information.

In an implementation, the position information may include a coordinate value. The coordinate value may be measured by lengths or pixel points.

Figure 2:
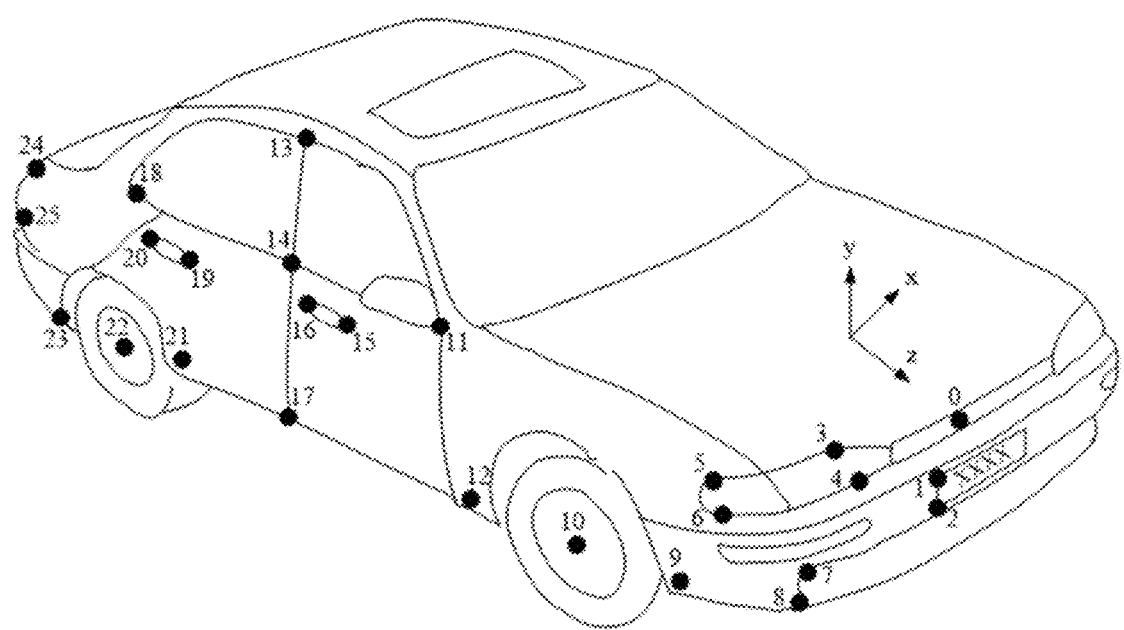
FIG. 2 is a schematic diagram of positions of preset key points on a 3D model of a vehicle according to the present disclosure.
Figure 3:
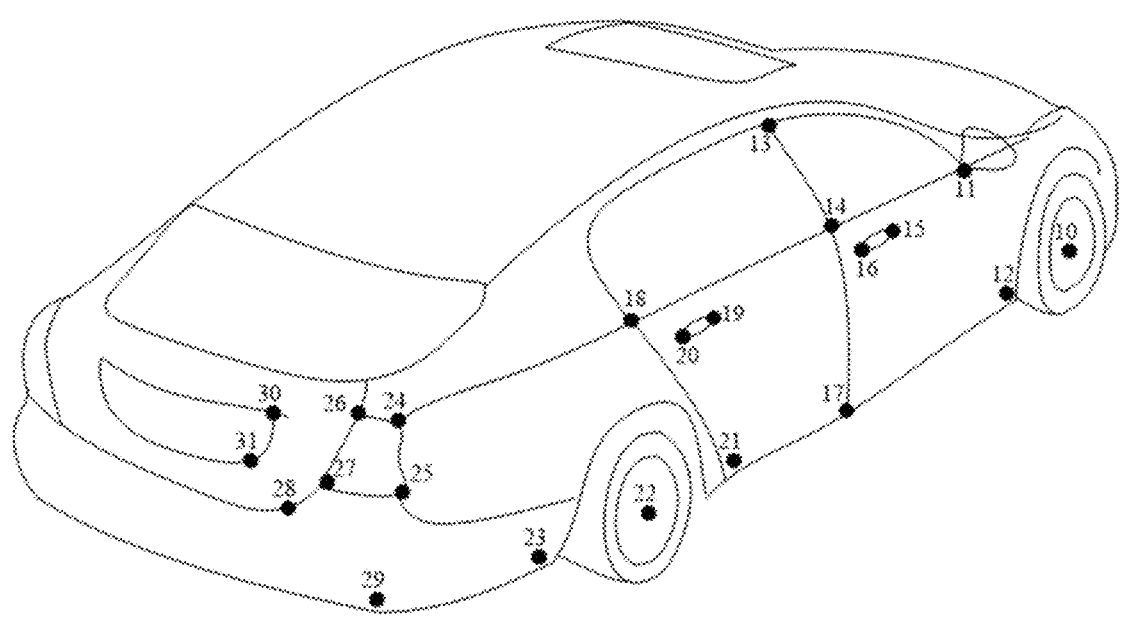
FIG. 3 is a schematic diagram of positions of some other preset key points on the 3D model of the vehicle according to the present disclosure.

Illustratively, FIG. 2 is a schematic diagram of positions of preset key points on a 3D model of the vehicle according to the present disclosure, FIG. 3 is a schematic diagram of positions of some other preset key points on the 3D model of the vehicle according to the present disclosure.

As shown in FIG. 2 and FIG. 3, there are 63 preset key points preset on the 3D model of the vehicle, the identifications of which are 0 to 62. FIG. 2 and FIG. 3 show the preset key points with identifications 0-31. According to the symmetry of the vehicle, the preset key points with identifications 1-31 are symmetric with the preset key points (not shown) with identifications 32-62.

Illustratively, preset key points with identifications 3-6 may identify an area where a right front lamp of the vehicle is located. For another example, preset key points with identifications 15-16 may identify an area where a handler of a right front door of the vehicle is located.

By providing preset key points on the 3D model of the vehicle, different areas on the vehicle may be identified with a combination of the preset key points.

It should be explained that the embodiment does not limit the position and amount of the preset key points. In order to facilitate the damage assessment, more preset key points can be provided on areas prone to be damaged to refine the granularity in partitioning the areas. Or, fewer preset key points can be set on areas not prone to be damaged, so that the amount of the key points can be reduced.

Figure 4:
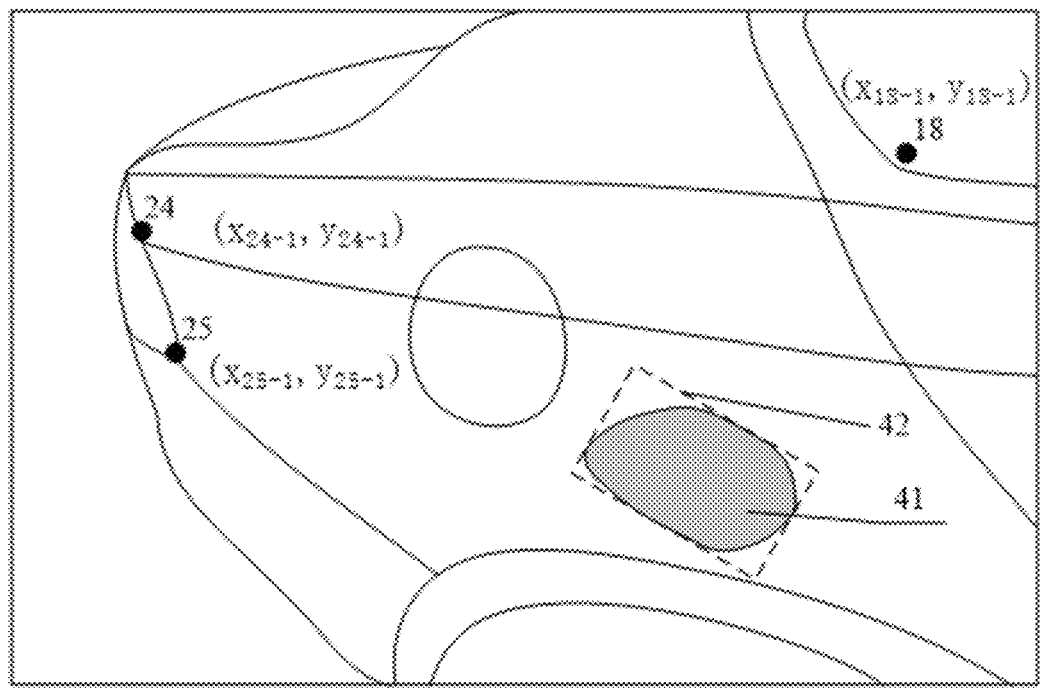
FIG. 4 is a schematic diagram of an image to be processed according to the present disclosure.

Illustratively, FIG. 4 is a schematic diagram of an image to be processed according to the present disclosure.

As shown in FIG. 4, an image to be processed is showing the rear right side of the vehicle. The image to be processed includes a damaged part 41. The key points included in the image to be processed include preset key points with an identification 18, an identification 24 and an identification 25. The first position information of the key point with the identification 18 can be marked as $(x_{18\text{-}1}, y_{18\text{-}1})$. The first position information of the key point with the identification 24 can be marked as $(x_{24\text{-}1}, y_{24\text{-}1})$, and the first position information of the key point with the identification 25 can be marked as $(x_{25\text{-}1}, y_{25\text{-}1})$.

It should be explained that the embodiment does not limit the position of the coordinate axis in the image to be processed.

It should be explained that the embodiment does not limit the method for structuring the 3D model of the vehicle.

Illustratively, a 3D model of a vehicle constructed according to structure from motion (SFM) will be explained as below.

The SFM algorithm is an off-line algorithm which can perform a three dimensional reconstruction based on various unsorted images that have been collected. Firstly, a series of image of the vehicle can be photographed from different angles. Then, corresponding points between two images can be identified in these images. Relative depth information can be acquired through a parallax among the corresponding points, so that the 3D model can be reconstructed.

In an implementation, in S103, the acquiring first position information of key points included in the image to be processed according to the image to be processed may include:

annotating the key points in the image to be processed.

inputting the image to be processed, of which the key points have been annotated, into a second neural network model to acquire the first position information of the key points in the image to be processed, the second neural network model being used to acquire position information of key points in an image.

Specifically, the second neural network model can be pre-trained. An input to the second neural network is a damage-assessment image of the vehicle with key points that have been annotated, and the output from the second neural network is position information of the key points in the image.

The second position information of the key points can be acquired via a neural network algorithm, thus improving a processing efficiency in acquiring the position information.

S104: determine a transformation relation between the image to be processed and a first fitting plane according to the key points included in the image to be processed and the first position information.

The first fitting plane is a fitting plane determined according to the key points included in the image to be processed on the 3D model.

Specifically, the first fitting plane is a fitting plane determined by the key points included in the image to be processed on the 3D model, and is capable of mapping a three-dimensional surface on the 3D model onto a two-dimensional plane. Illustratively, as shown in FIG. 4, the first fitting plane may be a fitting plane determined according to the preset key points with the identification 18, the identification 24 and the identification 25. After acquiring the key points included in the image to be processed, the transformation relation between the image to be processed and the first fitting plane can be determined according to the first position information of the key points. Thus, points, lines or areas in the image to be processed can be mapped into the first fitting plane according to the transformation relation. Accordingly, the points, lines or areas in the first fitting plane can be mapped onto the image to be processed.

S105: acquire a projection area of the damaged part in the first fitting plane according to the transformation relation.

S106: measure the projection area to acquire a measuring result.

It can be seen that, since the outer surface of a vehicle is an irregular curved surface, it is difficult to implement an accurate measurement on the damaged part on the irregular curved surface. Moreover, an accurate measuring result of a damaged part on the curved surface cannot be acquired from the image to be processed alone because the image, which is acquired by photographing the vehicle, is a two-dimensional planar image. In the embodiment, a two-dimensional plane where the image to be processed is located, a 3D model of the vehicle and a two-dimensional plane fitted through the partial outer surface of the vehicle can be connected by establishing a transformation relation between the image to be processed and the first fitting plane. The measuring result of the damaged part on the vehicle body can be acquired in the plane fitted through the partial outer surface of the vehicle by projecting the damaged part in the image to be processed onto the first fitting plane. A quantitative calculation of the damaged part can be implemented, thus improving the accuracy and efficiency in the damage-assessment of the damaged part. Meanwhile, the difficulty of a vehicle damage-assessment as well as labor costs can be reduced.

It should be explained that the embodiment does not limit the execution order of S102-S104.

Figure 5:
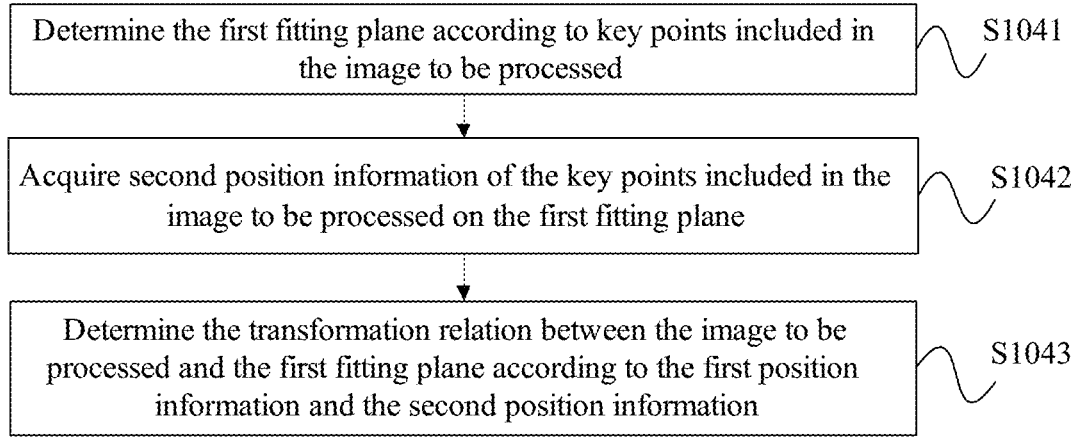
FIG. 5 is a flowchart for determining a transformation relation between an image to be processed and a first fitting plane according to an embodiment of the present disclosure.

In an implementation, referring to FIG. 5, which is a flowchart for determining a transformation relation between an image to be processed and a first fitting plane according to an embodiment of the present disclosure. As shown in FIG. 5, in S104, the determining the transformation relation between the image to be processed and the first fitting plane according to the key points included in the image to be processed and the first position information may include:

S1041: determine the first fitting plane according to the key points included in the image to be processed.

S1042: acquire second position information of the key points included in the image to be processed in the first fitting plane.

S1043: determine the transformation relation between the image to be processed and the first fitting plane according to the first position information and the second position information.

Now, illustrations will be given by way of example.

As shown in FIG. 4, the identifications of the key points included in the image to be processed are 18, 24 and 25. The first position information of the key points are $(x_{18-1}, y_{18-1})$, $(x_{24-1}, y_{24-1})$ and $(x_{25-1}, y_{25-1})$, respectively. It is assumed that, the second position information of the key points with the identifications 18, 24 and 25 $(x_{18-2}, y_{18-2})$, $(x_{24-2}, y_{24-2})$ and $(x_{25-2}, y_{25-2})$, respectively. Therefore, the transformation relation between the image to be processed and the first fitting plane can be determined according to point pairs $\{(x_{18-1}, y_{18-1}), (x_{18-2}, y_{18-2})\}$, $\{(x_{24-1}, y_{24-1}), (x_{24-2}, y_{24-2})\}$ and $\{(x_{25-1}, y_{25-1}), (x_{25-2}, y_{25-2})\}$. The matching point pairs can be determined according to the identifications of the key points.

In an implementation, in S1043, if the amount of the key points included in the image to be processed is 3, then the transformation relation can be determined by an affine transformation matrix method. If the amount of the key points included in the image to be processed is greater than 3, then the transformation relation can be determined by a homography transformation matrix method.

The implementations of S1041 and S1042 are explained below.

In an implementation, in an implementation, in S1041, the determining the first fitting plane according to the key points included in the image to be processed may include:

acquiring multiple standard fitting planes of a 3D model, a standard fitting plane being a fitting plane determined according to at least three preset key points on the 3D model; and determining the first fitting plane in the multiple standard fitting planes according to the key points included in the image to be processed.

Specifically, in this implementation, as the 3D model of the vehicle has been chosen, and the positions of the key points provided on the 3D model are also fixed. Thus, multiple standard fitting planes can be pre-determined according to the preset key points on the 3D model. For example, as shown in FIG. 2, one standard fitting plane can be determined by the preset key points with identifications 21-23. One standard fitting plane can be determined by the preset key points with identifications 14-17. Each standard fitting plane is generated by fitting at least 3 preset key points.

Accordingly, in S1042, the acquiring second position information of the key points included in the image to be processed in the first fitting plane may include:

acquiring position information of the preset key points, which are included in the first fitting plane, in the first fitting plane; and acquiring second position information according to the key points included in the image to be processed and the position information of the preset key points, which are included in the first fitting plane, in the first fitting plane.

Specifically, multiple standard fitting planes can be pre-determined according to the preset key points on the 3D model. The position information of the preset key points, which are included in each standard fitting plane, in each standard fitting plane can be pre-acquired. Thus, the second position information of the key points, which are included in the image to be processed, in the first fitting plane can be acquired according to the key points included in the image to be processed and the position information of the preset key points in the pre-acquired first fitting plane.

In an implementation, the determining the first fitting plane in the multiple standard fitting planes according to the key points included in the image to be processed may include:

determining the first fitting plane according to the identifications of the key points included in the image to be processed and the identifications of the preset key points included in each standard fitting plane.

This implementation may reduce the difficulty in determining the first fitting plane and acquiring the second position information.

Figure 6:
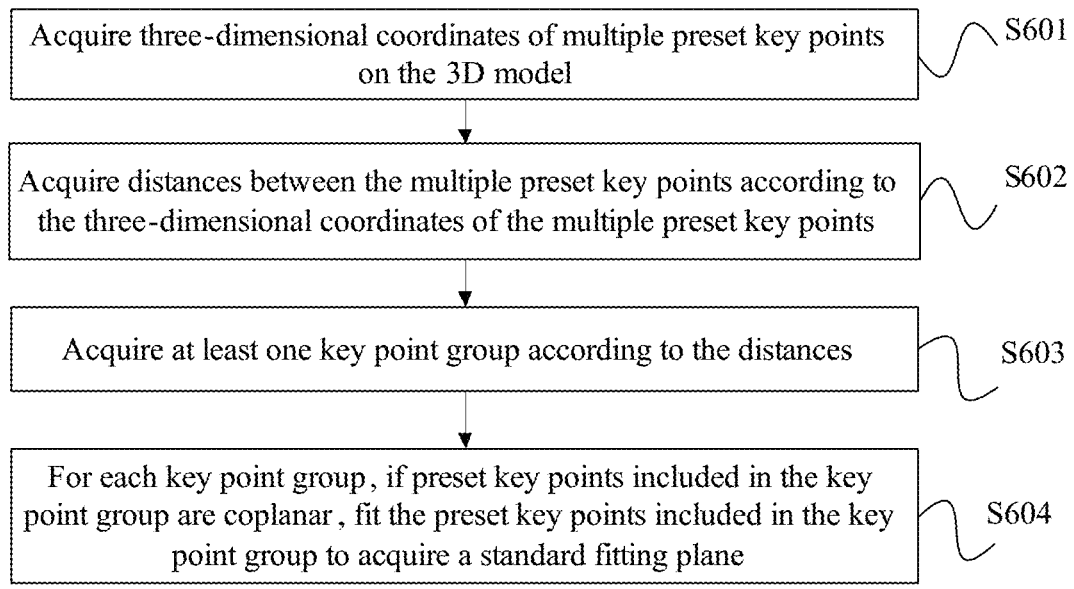
FIG. 6 is a flowchart for acquiring multiple standard fitting planes of a 3D model according to an embodiment of the present disclosure.

In an implementation, FIG. 6 is a flowchart for acquiring multiple standard fitting planes of a 3D model according to an embodiment of the present disclosure. As shown in FIG. 6, the acquiring multiple standard fitting planes of a 3D model may include:

S601: acquire three-dimensional coordinates of multiple preset key points on the 3D model.

Specifically, the 3D model of the vehicle is preset with the preset key points. The three-dimensional coordinates of the preset key points in a three-dimensional coordinate system can be acquired according to the 3D model. The embodiment does not limit the direction of the coordinate axis and the position of the original point in the three-dimensional coordinate system. For example, as shown in FIG. 2, the original point of the three-dimensional can be a projection of a vehicle central point in a plane determined by a wheel base. The positive direction of the X axis points to the left side of the vehicle, the positive direction of the Y axis points vertically up, and the positive direction of the Z axis points to the vehicle head. For another example, the original point of the three-dimensional coordinate system may be the vehicle central point.

S602: acquire distances between the multiple preset key points according to the three-dimensional coordinates of the multiple preset key points.

After acquiring the three-dimensional coordinates of the multiple preset key points, the distances between any two of the preset key points can be acquired. The embodiment does not limit the method for calculating the distance. For example, the Euclidean distance between two preset key points can be acquired through Equation 1.

$$d(x,y) = \sqrt{\sum_{i=0}^{3}(x_i - y_i)^2} \qquad \text{Equation 1}$$

where x and y represent two preset key points, respectively, $x_i$ represents the three-dimensional coordinate of a preset key point x, $y_i$ represents the three-dimensional coordinate of a preset key point y.

S603: acquire at least one key point group according to the distances.

The key point group includes at least three preset key points, a union of at least one key point group includes all the preset key points on the 3D model.

Specifically, each key point group may include at least 3 preset key points. The union of all the key point groups includes all the preset key points. A specific preset point may be located in at least one preset key point group. For example, as shown in FIG. 2, preset key points with identifications 19, 20, 14 and 18 may be a key point group. Preset key points with identifications 15, 16, 14 and 11 may also be a key point group.

It should be explained that the embodiment dose on limit the method for acquiring a key point group.

The following is illustrated by way of example using a k-Nearest Neighbor (kNN) algorithm.

K-nearest neighbor means k nearest neighbors. Each sample can be represented by its k nearest neighbors. The core idea of the kNN algorithm is that: most of the k nearest neighbors of a sample in a feature space belong to one category. In the embodiment, the kNN algorithm can be used to find the k nearest preset key points for each preset key point. For example, as shown in FIG. 2, for a preset key point with an identification 19, the kNN algorithm may produce K preset key points, i.e., preset key points with identifications 19, 20, 14 and 18.

S604: for each key point group, if preset key points included in the key point group are coplanar, fit the preset key points included in the key point group to acquire a standard fitting plane.

In an implementation, the preset key points included in the key point group may include the following case:

distances between preset key points included in the key point group and a first plane are less than or equal to a preset threshold value. The first plane may be a plane determined by at least three preset key points included in the key point group.

It should be explained that, the embodiment does not limit the specific value of the preset threshold value.

It should be explained that the embodiment does not limit the algorithm for acquiring the standard fitting plane according to the key point group.

For example, a random sample consensus (RANSAC) algorithm may be adopted to acquire the most fitting coplanar plane, i.e., the standard fitting plane, for each coplanar key point group.

The robustness of the standard fitting plane can be improved by adopting the RANSAC algorithm.

After acquiring the multiple standard fitting planes of the 3D model through the steps S601-S604 described above, for each of the standard fitting planes and the preset key points included in the standard fitting plane, the preset key points on the 3D model may be projected onto the standard fitting plane to acquire position information of the preset key points, which are included in the standard fitting plane, in the standard fitting plane.

Figure 7:
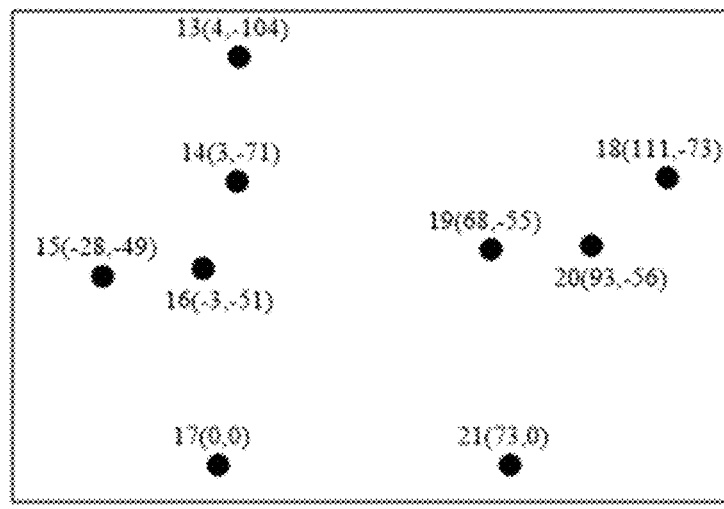
FIG. 7 is a schematic diagram of preset key points in a standard fitting plane according to an embodiment of the present disclosure.

Illustratively, FIG. 7 is a schematic diagram of preset key points in a standard fitting plane according to an embodiment of the present disclosure. As shown in FIG. 7, after preset key points with identifications 13-21 have been projected onto the standard fitting plane, a principle component analysis (PCA) method is adopted to preserve the two-dimensional coordinates of the preset key points to acquire the coordinates of the preset key points with identifications 13-21 on the standard fitting plane. The unit of the coordinate may be centimeter. For example, the coordinate of a preset key point with an identification 13 on the standard fitting plane may be identified as 13(4, −104).

In an implementation, in another implementation, in S1041, the determining the first fitting plane according to the key points included in the image to be processed may include:

acquiring three-dimensional coordinates on the 3D model;

acquiring distances between the key points according to the three-dimensional coordinates of the key points included in the image to be processed on the 3D model; and fitting the key points included in the image to be processed to acquire a first fitting plane.

Further reference may be made to related description about acquiring the multiple standard fitting plane of the 3D model, which follows a similar principle and will not be elaborated herein.

In an implementation, in S105, the acquiring the projection area of the damaged part in the first fitting plane according to the transformation relation may include:

acquiring outline points of the damaged part and third position information of the outline points in the image to be processed;

acquiring fourth position information of the outline points on the first fitting plane according to the third position information and the transformation relation; and determining the projection area according to the fourth position information.

In an implementation, in S106, the measuring result includes at least one of a length, a width and an area of the damaged part.

The length of the damaged part is a length of a minimum rectangle circumscribing the projection area.

The width of the damaged part is a width of the minimum rectangle circumscribing the projection area;

The area of the damaged part is an area of the projection area.

In an implementation, a triangular patch method can be adopted when calculating the area of the projection area. The projection area is divided into multiple triangular patches, a sum of the areas of the triangular patches is the total area of the projection area. And the total area is referred to as the area of the damaged part.

Illustratively, for the length and width of the damaged part, as shown in FIG. 4, the rectangle 42 is the minimum rectangle circumscribing the damaged part 41. Here, only a schematic diagram of the minimum circumscribing rectangle is provided. In the embodiment of the present disclosure, the minimum circumscribing rectangle is actually a minimum rectangle circumscribing the projection area on the first fitting plane.

Illustratively, according to the measuring method for a damaged part of a vehicle provided in the embodiment of the present disclosure, the damaged part 41 has a length of 3.446 decimeters, a width of 2.555 decimeters, and an area of 6.95 square decimeters.

It can be seen that, the embodiment provides a measuring method for a damaged area of a vehicle, including: acquiring an image to be processed of a vehicle; acquiring the damaged part of the vehicle in the image to be processed according to the image to be processed; acquiring the first position information of the key points included in the image to be processed according to the image to be processed; determining a transformation relation between the image to be processed and the first fitting plane according to the key points included in the image to be processed and the first position information; acquiring a projection area of the damaged part on the first fitting plane according to the transformation relation, and measuring the projection area to acquire the measuring result. In the measuring method for a damaged part of a vehicle provided in the embodiment, the fitting plane for measuring the damaged part of the vehicle can be acquired by applying a planer approximation method to the partial outer surface of the vehicle. The transformation relation between a fitting plane determined by the key points included in the image to be processed and the image to be processed can be acquired through acquiring the position information of the key points included in the image to be processed. Further, the measuring result of the damaged part on the vehicle body can be acquired in the plane fitted through the partial outer surface of the vehicle, by projecting the damaged part in the image to be processed into the fitting plane. Thus, a quantitative calculation of the damaged part can be implemented, thus improving a damage-assessment accuracy and efficiency of the damaged part.

Figure 8:
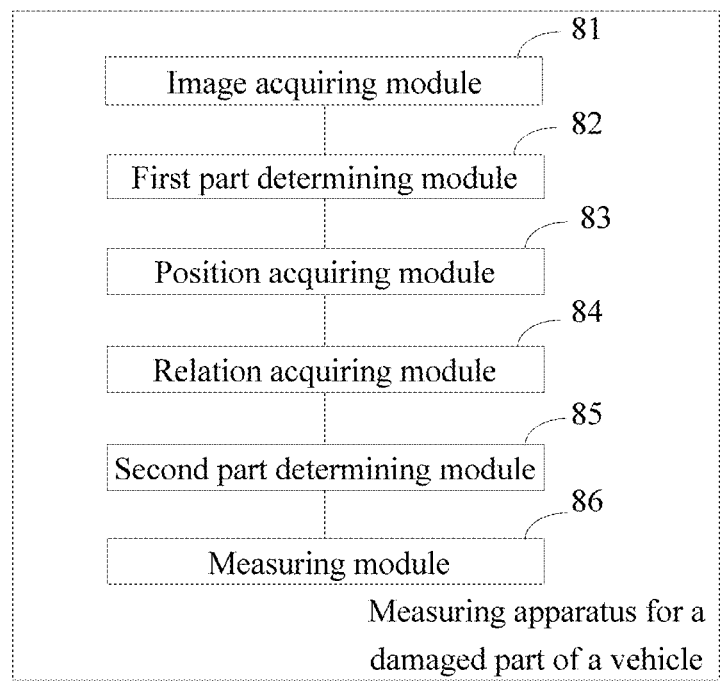
FIG. 8 is a schematic structural diagram of a measuring apparatus for a damaged area of a vehicle according to Embodiment 1 of the present disclosure.

FIG. 8 is a schematic structural diagram of a measuring apparatus for a damaged part of a vehicle according to Embodiment 1 of the present disclosure. The measuring apparatus of a damaged part of a vehicle provided in the embodiment is configured to implement the measuring method for a damaged part of a vehicle provided in any one of the implementations in FIG. 1-FIG. 7. As shown in the figures, the measuring apparatus for a damaged part of a vehicle provided in the embodiment, may include:

an image acquiring module 81, configured to acquire an image to be processed of the vehicle;

a first part determining module 82, configured to acquire the damaged part of the vehicle in the image to be processed according to the image to be processed;

a position acquiring module 83, configured to acquire first position information of key points included in the image to be processed according to the image to be processed, where the key points are points provided at preset positions of a 3D model of the vehicle;

a relation acquiring module 84, configured to determine a transformation relation between the image to be processed and a first fitting plane according to the key points included in the image to be processed and the first position information, where the first fitting plane is a fitting plane determined according to the key points included in the image to be processed and on the 3D model;

a second part determining module 85, configured to acquire a projection area of the damaged part on the first fitting plane according to the transformation relation; and a measuring module 86, configured to measure the projection area to acquire a measuring result.

In an implementation, the relation acquiring module 84 may be specifically configured to:

determine the first fitting plane according to the key points included in the image to be processed;

acquire second position information of the key points included in the image to be processed on the first fitting plane;

determine the transformation relation between the image to be processed and the first fitting plane according to the first position information and the second position information.

In an implementation, the relation acquiring module 84 may be specifically configured to:

acquire multiple standard fitting planes of a 3D model, the standard fitting planes being fitting planes determined according to at least three preset key points on the 3D model; and determine the first fitting plane in multiple fitting planes according to the key points included in the image to be processed.

In an implementation, the relation acquiring module 84 is specifically configured to:

acquire three-dimensional coordinates of the multiple key points on the 3D model;

acquire distances between the multiple preset key points according to the three-dimensional coordinates of the multiple key points;

acquire at least one key point group according to the distances. The key point group includes at least three preset key points, a union of at least one key point group includes all the preset key points on the 3D model; and for each of the key point groups, if preset key points included in the key point group are coplanar, fit the preset key points included in the key point group to acquire a standard fitting plane.

In an implementation, the relation acquiring module 84 is specifically configured to:

determine the first fitting plane according to identifications of the key points included in the image to be processed and identifications of the preset key points included in each of the standard fitting planes.

In an implementation, the second part determining module 85 is specifically configured to:

acquire outline points of the damaged part and third position information of the outline points in the image to be processed;

acquire fourth position information of the outline points in the first fitting plane according to the third position information and the transformation relation; and determine a projection area according to the fourth position information.

In an implementation, the first part determining module 82 is specifically configured to:

input the image to be processed into a first neural network model to acquire the damaged part, the first neural network model being used to acquire a damaged part of a vehicle in an image.

In an implementation, the position acquiring module 83 is specifically configured to:

annotate key points in the image to be processed;

input the image to be processed, of which the key points have been annotated, into a second neural network model to acquire the first position information of the key points in the image to be processed, the second neural network model being used to acquire position information of key points in an image.

In an implementation, the measuring result includes at least one of a length, a width and an area of the damaged part;

the length of the damaged part is a length of a minimum rectangle circumscribing the projection area;

the width of the damaged part is a width of the minimum rectangle circumscribing the projection area; and the area of the damaged part is an area of the projection area.

The measuring apparatus for a damaged part of a vehicle provided in the embodiment, configured to implement the measuring method for a damaged area of a vehicle provided in any one of embodiments in FIG. 1-FIG. 7. The specific implementation and technical effects are similar, which will not be elaborate herein.

Figure 9:
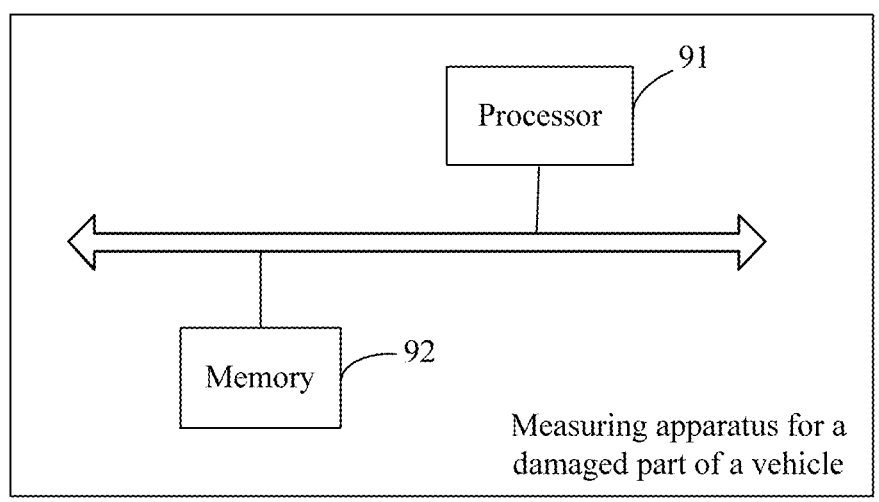
FIG. 9 is a schematic structural diagram of the measuring apparatus for a damaged area of a vehicle according to Embodiment 2 of the present disclosure.

FIG. 9 is a schematic structural diagram of a measuring apparatus for a damaged area of a vehicle according to Embodiment 2 of the present disclosure. As shown in the figure, the measuring apparatus for a damaged part of the vehicle includes a processor 91 and a memory 92. The memory 92 is configured to store instructions, and the processor 91 is configured to execute the instructions stored in the memory 92 to enable the measuring apparatus for a damaged area of a vehicle to execute the measuring method for a damaged area of a vehicle provided in any one of embodiments shown in FIG. 1-FIG. 7. The specific implementation and technical effects are similar, and will not be elaborated herein.

It should be noted that the separation of modules of the above apparatuses is only by their logical functions, and may be integrated in part or in whole into one physical entity in an actual implementation, or may be physically separated. And these modules can all be implemented in the form of software called by a processing component, or all of them can be implemented in hardware form. Some modules can be realized by processing component calling software, and some modules are realized by hardware. For example, the determining module may be a standalone processing element, or may be integrated in one of the chips of the above-mentioned apparatuses, or may be stored in the memory of the above device in the form of program codes that are called and executed by a processing element of the above apparatus. Similar is the implementation of other modules. In addition, all or part of these modules may be integrated together, or be implemented independently. The processing element described herein may be an integrated circuit with signal processing capabilities. In an implementation process, various steps of the above methods or modules may be completed by an integrated logic circuit of hardware in the processing element or an instruction in a form of software.

For example, the above modules may be configured to be one or more integrated circuits, e.g., one or more disclosure specific integrated circuits (ASIC), or one or more digital signal processor (DSP), or one or more field programmable gate arrays (FPGA), to implement the above methods. As another example, when one of the above modules is implemented in the form of a processing component scheduling program codes, the processing component may be a general purpose processor, such as a central processing unit (CPU), or other processor that can invoke the program code. As still another example, these modules may be integrated and implemented in the form of a system-on-a-chip (SOC).

The above embodiments may be implemented in whole or in part by software, hardware, firmware, or any combination thereof. When implemented in software, they may be implemented in whole or in part in the form of a computer program product. The computer program product includes one or more computer instructions. When the computer program instructions are loaded and executed on a computer, the processes or functions described in accordance with embodiments of the present disclosure are generated in whole or in part. The computer can be a general purpose computer, a special purpose computer, a computer network, or other programmable device. The computer instructions may be stored in a computer readable storage medium or transferred from one computer readable storage medium to another. For example, the computer instructions may be transmitted from a website site, computer, server or data center to another website site, computer, server, or data center by wire (for example, coaxial cable, fiber optic, digital subscriber line (DSL)) or wirelessly (for example, infrared, wireless, microwave, etc.). The computer readable storage medium may be any available medium that can be accessed by a computer or a data storage device such as a server, data center or the like that includes one or more available media. The available medium may be a magnetic medium (for example, a floppy disk, a hard disk, a magnetic tape), an optical medium (for example, a DVD), or a semiconductor medium (for example, a solid state disk (SSD)) or the like.

One of ordinary skill in the art will appreciate that all or part of the steps to implement the various method embodiments described above may be accomplished by hardware associated with program instructions. The aforementioned program may be stored in a computer readable storage medium. The program, when executed, performs the steps including the foregoing method embodiments; and the storage medium includes various media, such as a ROM, a RAM, a magnetic disk, or an optical disk, that may store program codes.

It should be noted at last that the above embodiments are only used to explain, rather than limit, the technical solutions of the embodiments of the present disclosure. Although the present disclosure have been described in detail with reference to the foregoing embodiments, those skilled in the art should understand that the technical solutions described in the foregoing embodiments may be modified, or some or all of the technical features may be equivalently replaced; and the modifications and replacements do not cause the essence of the resultant technical solutions to depart from the scope of the technical solutions of the present disclosure.

What is claimed is:

1. A measuring method for a damaged part of a vehicle, comprising:
    acquiring an image to be processed of a vehicle;
    acquiring the damaged part of the vehicle in the image to be processed according to the image to be processed;
    acquiring first position information of key points comprised in the image to be processed according to the image to be processed, wherein the key points are points provided at preset positions of a 3D model of the vehicle;
    determining a transformation relation between the image to be processed and a first fitting plane according to the key points comprised in the image to be processed and the first position information, wherein the first fitting plane is a two-dimensional plane fitted according to the key points comprised in the image to be processed on the 3D model;
    acquiring a projection area of the damaged part in the first fitting plane according to the transformation relation; and
    measuring the projection area to acquire a measuring result;
    wherein the determining a transformation relation between the image to be processed and a first fitting plane according to the key points comprised in the image to be processed and the first position information comprises:
    determining the first fitting plane according to the key points comprised in the image to be processed;
    acquiring second position information of the key points comprised in the image to be processed in the first fitting plane; and
    determining the transformation relation between the image to be processed and the first fitting plane according to the first position information and the second position information.

2. The method according to claim 1, wherein the determining the first fitting plane according to the key points comprised in the image to be processed comprises:
    acquiring multiple standard fitting planes of the 3D model, the standard fitting planes being fitting planes determined according to at least three preset key points on the 3D model; and determining the first fitting plane in the multiple standard fitting planes according to the key points comprised in the image to be processed.

3. The method according to claim 2, wherein the acquiring multiple standard fitting planes of the 3D model comprises:
acquiring three-dimensional coordinates of multiple preset key points on the 3D model;
acquiring distances between the multiple preset key points according to the three-dimensional coordinates of the multiple preset key points;
acquiring at least one key point group according to the distances, the key point group comprising at least three preset key points, and a union of the at least one key point group comprising all preset key points of the 3D model; and
for each of the key point groups, if the preset key points comprised in the key point group are coplanar, fitting the preset key points comprised in the key point group to acquire a standard fitting plane.

4. The method according to claim 2, wherein the determining the first fitting plane in the multiple standard fitting planes according to the key points comprised in the image to be processed comprises:
determining the first fitting plane according to identifications of the key points comprised in the image to be processed and identifications of preset key points comprised in each of the standard fitting planes.

5. The method according to claim 1, wherein the acquiring a projection area of the damaged part in the first fitting plane according to the transformation relation comprises:
acquiring outline points of the damaged part and third position information of the outline points in the image to be processed;
acquiring fourth position information of the outline points in the first fitting plane according to the third position information and the transformation relation; and
determining the projection area according to the fourth position information.

6. The method according to claim 1, wherein the acquiring the damaged part of the vehicle in the image to be processed according to the image to be processed comprises:
inputting the image to be processed into a first neural network model to acquire the damaged part, the first neural network model being used to acquire a damaged part of a vehicle in an image.

7. The method according to claim 1, wherein the acquiring first position information of key points comprised in the image to be processed according to the image to be processed comprises:
annotating the key points in the image to be processed; and
inputting the image to be processed, of which the key points have been annotated, into a second neural network model to acquire the first position information of the key points in the image to be processed, the second neural network model being used to acquire position information of key points in an image.

8. The method according to claim 1, wherein the measuring result comprises at least one of: a length, a width, and an area of the damaged part,
wherein the length of the damaged part is a length of a minimum rectangle circumscribing the projection area;
the width of the damaged part is a width of the minimum rectangle circumscribing the projection area; and
the area of the damaged part is an area of the projection area.

9. A measuring apparatus for a damaged part of a vehicle, comprising: a memory and a processor, wherein
the memory is configured to store program instructions,
the processor is configured to call the program instructions stored in the memory to acquire an image to be processed of a vehicle;
acquire the damaged part of the vehicle in the image to be processed according to the image to be processed;
acquire first position information of key points comprised in the image to be processed according to the image to be processed, wherein the key points are points provided at preset positions of a 3D model of the vehicle;
determine a transformation relation between the image to be processed and a first fitting plane according to the key points comprised in the image to be processed and the first position information, wherein the first fitting plane is a two-dimensional plane fitted according to the key points comprised in the image to be processed on the 3D model;
acquire a projection area of the damaged part in the first fitting plane according to the transformation relation; and
measure the projection area to acquire a measuring result;
wherein the processor is further configure to:
determine the first fitting plane according to the key points comprised in the image to be processed;
acquire second position information of the key points comprised in the image to be processed in the first fitting plane; and
determine the transformation relation between the image to be processed and the first fitting plane according to the first position information and the second position information.

10. The apparatus according to claim 9, wherein the processor is configured to:
acquire multiple standard fitting planes of the 3D model, the standard fitting planes being fitting planes determined according to at least three preset key points on the 3D model; and
determine the first fitting plane in the multiple standard fitting planes according to the key points comprised in the image to be processed.

11. The apparatus according to claim 10, wherein the processor is configured to:
acquire three-dimensional coordinates of multiple preset key points on the 3D model;
acquire distances between the multiple preset key points according to the three-dimensional coordinates of the multiple preset key points;
acquire at least one key point group according to the distances, the key point group comprising at least three preset key points, and a union of the at least one key point group comprising all preset key points of the 3D model; and
for each of the key point groups, if the preset key points comprised in the key point group are coplanar, fit the preset key points comprised in the key point group to acquire a standard fitting plane.

12. The apparatus according to claim 10, wherein the processor is configured to:
determine the first fitting plane according to identifications of the key points comprised in the image to be processed and identifications of preset key points comprised in each of the standard fitting planes.

13. The apparatus according to claim 9, wherein the processor is configured to:

acquire outline points of the damaged part and third position information of the outline points in the image to be processed;

acquire fourth position information of the outline points in the first fitting plane according to the third position information and the transformation relation; and determine the projection area according to the fourth position information.

14. The apparatus according to claim 9, wherein the processor is configured to:

input the image to be processed into a first neural network model to acquire the damaged part, the first neural network model being used to acquire a damaged part of a vehicle in an image.

15. The apparatus according to claim 9, wherein the processor is configured to:

annotate the key points in the image to be processed; and input the image to be processed, of which the key points have been annotated, into a second neural network model to acquire the first position information of the key points in the image to be processed, the second neural network model being used to acquire position information of key points in an image.

16. The apparatus according to claim 9, wherein the measuring result comprises at least one of: a length, a width and an area of the damaged part, wherein the length of the damaged part is a length of a minimum rectangle circumscribing the projection area;

the width of the damaged part is a width of the minimum rectangle circumscribing the projection area; and the area of the damaged part is an area of the projection area.

17. A non-volatile storage medium, comprising: a readable storage medium, and a computer program used to implement the measuring method for a damaged area of a vehicle according to claim 1.

* * * * *